Patented July 15, 1952

2,603,623

UNITED STATES PATENT OFFICE 2,603,623

REACTION PRODUCTS OF ETHERIFIED AMINOTRIAZINEALDEHYDE WITH ALKALI METAL SALTS OF SULFUROUS ACID

Francis A. Bonzagni, Winthrop, Mass., assignor to Monsanto Chemical Company, St. Louis, Mo., a corporation of Delaware No Drawing. Application July 30, 1948, Serial No. 41,724

9 Claims. (Cl. 260—67.6)

The present invention relates to novel nitrogen containing thermosetting resins and to a process for preparing such resins.

It is one object of the present invention to prepare novel etherified amino-triazine-aldehyde resins.

A further object of the invention is the preparation of etherified amino-triazine-aldehyde resins in the form of dry, free-flowing powders.

A further object of the invention is the preparation of solid derivatives of methyl ethers of methylol melamines which derivatives are characterized by excellent water solubility, stability, ease of handling and which are further characterized in that they are substantially free of uncombined formaldehyde.

A further object of the present invention is the preparation of the foregoing novel etherified amino-triazine-aldehyde resins by a simple and efficient process.

Still further objects and advantages of the present invention will appear from the following description and the appended claims.

The foregoing and other objects of the invention are broadly attained by contacting or mixing a preformed monomeric or low polymeric etherified amino-triazine-aldehyde resin or condensation product, preferably melamine-formaldehyde resins which have been etherified with lower aliphatic monohydric and dihydric alcohols, in an alkaline solution with a small proportion of an alkali metal salt of sulfurous acid such as alkali metal sulfites, bisulfites and metabisulfites and then drying the resulting solution. The process described herein is preferably carried out by reacting such preformed resins and alkali metal salts of sulfurous acid in an alkaline solution before the concentration of the resin solution exceeds about 70% by weight solids, but may be carried out at any stage of the drying of the resin solution during which the preformed resin and alkali metal salt can be intimately contacted and reacted. The alkaline solution comprising the preformed resin can be dried in various well-known ways, as, for example, by allowing the water or other solvents therein to evaporate, by vacuum drying, by spray drying, by drum drying and by other methods and apparatus known in the art. The nitrogen-containing thermosetting resins obtained in accordance with the process described herein are two solids as distinguished from viscous liquids, plastic masses, semi-solids, syrups and the like which undergo plastic deformation or tend to flow when subjected to pressure.

The above reaction is preferably carried out in an aqueous alkaline solution of the resin since the alkali metal salts of sulfurous acid are more readily soluble in an aqueous solution and the preformed resin and such alkali metal salts are thereby brought into more intimate contact one with the other. However, the reaction may be carried out in other liquid media as, for example, water-alcohol mixtures which not only are solvents for the preformed resin, but which also do not react with such alkali metal compounds as readily as the preformed resins.

The resinous products which are obtained by the process described herein are obtained in the form of stable solids and may be obtained in various solid forms depending on the method of drying. Thus they may be obtained as free-flowing powders or may be converted into such powders by simply breaking up the solid product in a suitable grinding or pulverizing apparatus. The solubility of these resinous products in water, water-alcohol mixtures and organic solvents varies considerably depending upon the original starting materials employed in their manufacture, the conditions under which the preformed resin is prepared, the quantity of alkali metal salt of sulfurous acid combined therewith and other factors. For example, when an aqueous solution of a melamine-formaldehyde resin which has been etherified with methanol is reacted with a small proportion of sodium metabisulfite at temperatures between the range of 50 to 90° C. for example, and for periods of time varying between about 2 to 30 minutes and the resulting solution is dried using a drum drier, a free-flowing, stable powder is obtained which is extremely soluble in water.

The resinous products which are prepared by the process described herein are thermosetting resins, that is, they harden and become solvent resistant when heated. The hardening or curing of the resin is greatly accelerated when the resin is heated in the presence of catalysts such as acid materials or materials which yield acids when heated. These resinous products have a wide variety of uses depending to a certain extent upon the solubility of the product in water or organic solvents, and depending also upon the starting materials employed in their manufacture. Thus, they may be used in lacquers or coating compositions, in printing inks, as adhesives for the bonding of laminae of cloth, paper, plywood and the like, as insolubilizing agents for starch and other water-soluble materials of a similar nature, as moulding powders and for many other purposes. The water-soluble resinous products which are prepared in accordance with the present invention are particularly suitable for use in textile finishing operations, as, for example, for imparting dimensional stability to woolen, cotton and rayon fabrics, for imparting crease resistance and crush resistance to textile fabrics and for other well-known texile uses. Such water-soluble resins are also valuable in the production of high wet strength papers. This list is not exhaustive, of course, and other uses will be apparent to those skilled in the art.

The above resinous products may be prepared from a variety of preformed etherified amino-triazine-aldehyde resins. While it is preferred to prepare such products from a preformed monomeric or low polymeric melamine-formaldehyde resin which has been etherified with methanol, other preformed amino-triazine-aldehyde resins which have been etherified with lower aliphatic monohydric and dihydric alcohols may be used in their preparation. Such etherified amino-triazine-aldehyde resins may be prepared in general, by first reacting a suitable amino-triazine with an aldehyde in an aqueous or organic solution and then reacting or alkylating the resulting product with a lower aliphatic monohydric and/or dihydric alcohol such as methanol, ethanol, isopropanol, sec butyl alcohol, tertiary butyl alcohol, ethylene glycol, diethylene glycol, propylene glycol and the like. However, the above preformed resins may be prepared by reacting the amino-triazine, aldehyde and alcohol simultaneously, preferably in the presence of an acid, such as a mineral acid. As examples of amino-triazines which may be employed as starting materials in the preparation of such preformed resins may be mentioned, in addition to melamine, 2:methyl-4;6 diamino-1:3:5 triazine, 2:chloro-4:6 diamino-1:3:5 triazine, 2:6 diamino-4 phenyl-1:3:5 triazine, 2:methyl-4:6 triamino-1:3:5 triazine, 2:4 dimethyl-6:triamino-1:3:5 triazine, 2:4 diamino-1:3:5 triazine and the like. Amino-triazines comprising at least 4 replaceable hydrogen atoms on the amino groups attached to the triazine ring are preferably employed in the preparation of such etherified amino-triazine-aldehyde resins.

As examples of aldehydes which may be employed in the preparation of the foregoing preformed resins, in addition to formaldehyde, may be mentioned the lower aliphatic monoaldehydes such as acetaldehyde, propionic aldehyde, butyraldehyde and the like, compounds which form formaldehyde on heating such as para-formaldehyde and the like, furfural, glyoxal and the like. Of these, formaldehyde is specifically preferred while the lower aliphatic monoaldehydes are second in usefulness and suitability.

The resinous products of the present invention may be prepared in a variety of ways. A suitable process for preparing such a product from a preformed resin prepared from melamine, formaldehyde and methanol is described hereinafter. However, the resinous products of the present invention can be prepared from other preformed resins prepared from amino-triazines, aldehydes and alcohols of the type described above by a substantially similar procedure or by other methods. The proportions of melamine, formaldehyde and methanol which are employed in preparing the preformed resin which is to be reacted with an alkali metal salt of sulfurous acid may be varied considerably depending upon the use of the end product. Such preformed resins are suitably prepared, for example, by first reacting from about 3 to 8 or more molecular proportions of formaldehyde preferably as formalin with about 1 molecular proportion of melamine and then reacting the resulting product with from about 10 to 30 molecular proportions of methanol under acid conditions, for example, at a pH of about 1 to 4. The methyl ethers of methylol melamines which are obtained when using the foregoing proportions of reactants will vary from resins analyzing about 1 mol of melamine:2.5 mols of combined formaldehyde and 2 mols of combined methanol to resins analyzing about 1 mol of melamine:6 mols of combined formaldehyde:5 mols of combined methanol depending upon the duration of the reaction, the pH of the mixture during the etherification reaction, the temperature at which the reactions are carried out and other factors. Such resins are, in general, water-soluble, that is hydrophilic, but can be made water-insoluble or hydrophobic by prolonged heating.

The above described preformed resins can be reacted with various proportions of the alkali metal salts of sulfurous acid depending to a certain extent upon the properties desired in the final resinous product and the pH of the solution in which the reaction is carried out. Suitable resinous products are prepared, for example, by employing the above alkali metal salts in an amount sufficient to provide at least 0.1 mol of combined $SO_3$ for each mol of melamine or amino-triazine in the preformed resin. Thus there may be used at least 0.1 mol of sodium bisulfite for each mol of melamine or amino-triazine in the preformed resin, or 0.05 mol of sodium metabisulfite may be used for each mol of melamine or amino-triazine in the preformed resin since at least 0.1 mol of combined $SO_3$ will be formed by the hydrolysis of that amount of sodium metabisulfite. Similarly suitable resinous products are also prepared by reacting a preformed resin of the type hereinbefore described with an amount of alkali metal salt of sulfurous acid sufficient to provide 0.5 mol of combined $SO_3$ for each mol of melamine or amino-triazine in the resin.

The pH of the solution in which the above reaction is carried out is maintained on the alkaline side of pH 7 during the above reaction and is also maintained on the alkaline side of pH 7 during the subsequent removal of water or other solvent in the preparation of the solid end product. Particularly desirable resinous products are obtained when the solution, in which the preformed resin and the alkali metal salts of sulfurous acid are reacted, is maintained at a pH between about 8.5 to 11.0 during the reaction period and the subsequent drying step.

Of the alkali metal salts of sulfurous acid which are reacted with the above preformed resins in accordance with the present invention the alkali metal bisulfites and metabisulfites are preferably employed. As examples of these may be mentioned sodium bisulfite, sodium metabisulfite, potassium bisulfite, potassium metabisulfite, lithium bisulfite, lithium metabisulfite and the like. Sodium metabisulfite, sodium bisulfite and sodium sulfite are particularly suitable for the preparation of the resinous products of the present invention.

A further understanding of the invention will be obtained from the following examples which are intended to be illustrative of the present invention, but not limitative of the scope thereof.

parts and percentages being by weight unless otherwise specified.

Example I

An etherified amino-triazine-aldehyde resin was prepared by first reacting about 365 parts of 37% formalin (about 4.5 mols of formaldehyde) in the form of a neutral aqueous solution with about 126.7 parts of melamine (about 1 mol) at a temperature of approximately 100° C. until a solution was obtained. About 800 parts (25 mols) of methanol were added to the above solution and the mixture was heated at 45° C. in the presence of about 0.1 mol of hydrochloric acid. The reaction is allowed to proceed for 30 minutes, after which, heating was discontinued and the solution was then neutralized to the phenolphthalein endpoint with an aqueous solution of sodium hydroxide. The resulting solution was then concentrated by evaporation until it contained 60% resin solids by weight. This solution was capable of extreme dilution with water, ethanol or methanol. When a sample of this solution is dried, that is, the solvents and liquids contained therein are evaporated, a syrupy or honey-like product is obtained.

The above resin solution comprising 60% of resin was adjusted to pH 10.5 by the addition of caustic soda and the resulting solution was stirred on a steam bath with 19.2 parts of sodium metabisulfite (0.2 mol combined $SO_3$ per mol of melamine) and 5 c. c. of 10% caustic soda solution for about 30 minutes. The temperature of the solution was about 85° C. during this period. The pH of the resulting solution at normal room temperature was about 10.2. The solution was then vacuum dried. A dry, free-flowing white powder which was extremely soluble in water was obtained.

Example II

An etherified amino-triazine-aldehyde resin was prepared by first reacting about 126 parts (about 1 mol) of melamine with about 485 parts (6 mols $CH_2O$) of 37% formalin at a temperature of 90° C. for a period of 10 minutes. The resulting mixture was then reacted with about 640 parts (20 mols) of methanol in the presence of about 0.1 mol of hydrochloric acid for a period of 15 minutes and at a temperature of about 55° C. Heating was then discontinued and the solution was adjusted to a pH of about 9.0 (as measured with a Beckman pH meter) by the addition of caustic soda. The solution was then concentrated by evaporation until it contained about 50% resin solids. When a sample of this solution is dried by evaporating off the solvents and liquids contained therein a syrupy or honey-like product is obtained.

The foregoing resin solution was stirred on a steam bath for a period of 45 minutes with 15.8 parts of sodium bisulfite while being heated at a temperature of about 60° C. The resulting solution was then dried, that is, the water, unreacted formaldehyde and unreacted methanol were then evaporated or driven off by means of a drum drier and the resinous reaction product was recovered as a substantially dry, free-flowing powder. This powder was extremely soluble in water.

Other modifications in reaction conditions in carrying out the reaction between the preformed etherified amino-triazine-aldehyde resins and the alkali metal salt of sulfurous acid other than those described in the foregoing examples may be used. For example, the reactants need not be heated. For example, the reaction may be carried out at normal room temperatures for longer periods of time or the reaction may be carried out at 100° C. under reflux in a short period of time. A suitable reaction period is 5 to 30 minutes at temperatures of about 80 to 100° C. with the shorter reaction period corresponding to the higher temperature. Similarly the solution thus obtained may be dried at various temperatures depending upon the drying apparatus or method used. Suitable drying temperatures are from about 20 to 90° C.

In another modification of the invention the alkali salt of sulfurous acid may be formed in situ in the solution comprising the preformed etherified amino-triazine-aldehyde resin and the reaction may be carried out in the normal manner. Such alkali metal salts may be formed, for example, by bubbling sulfur dioxide through the resin solution in the presence of sufficient alkali metal hydroxide or alkali metal carbonate to insure that the solution remains alkaline and then discontinuing the treatment with sulfur dioxide when the desired quantity of alkali metal salt has been formed.

Still other modifications and changes may be made in carrying out the invention as will be apparent to those skilled in the art, and it is intended that the invention only be limited to the scope of the appended claims.

What is claimed is:

1. A process of preparing a solid nitrogen-containing thermosetting resin which comprises reacting a water-soluble preformed etherified melamine-formaldehyde resin in an alkaline aqueous solution with an amount of an alkali metal salt of sulfurous acid sufficient to provide at least 0.1 mol of combined $SO_3$ for each mol of melamine in said resin, said preformed resin having been prepared by reacting 1 molecular proportion of melamine with from about 3 to 8 molecular proportions of formaldehyde in an alkaline aqueous solution to form a melamine-formaldehyde resin and thereafter reacting said melamine-formaldehyde resin with at least 10 molecular proportions of methanol in an aqueous solution at a pH of about 1 to 4 to form a water-soluble methyl ether of methylol melamine containing from 2.5 to 6 mols of combined formaldehyde and from 2 to 5 mols of combined methanol for each mol of melamine, and neutralizing the resulting solution; and then drying said first mentioned solution until a solid product is obtained.

2. A process according to claim 1, but further characterized in that the alkali metal salt of sulfurous acid is sodium metabisulfite.

3. A process according to claim 1, but further characterized in that the alkali metal salt of sulfurous acid is sodium bisulfite.

4. A process according to claim 1, but further characterized in that the alkali metal salt of sulfurous acid is sodium sulfite.

5. A water-soluble, solid nitrogen-containing thermosetting resin comprising the product obtained by contacting in an alkaline aqueous solution a water-soluble preformed methyl ether of melamine-formaldehyde resin with an amount of an alkali metal salt of sulfurous acid sufficient to provide at least 0.1 mol of combined $SO_3$ for each mol of melamine in said resin, said preformed resin having been prepared by reacting 1 molecular proportion of melamine with from about 3 to 8 molecular proportions of formaldehyde in an alkaline aqueous solution to form a melamine-formaldehyde resin and thereafter reacting said melamine-formaldehyde resin with at least 10 molecular proportions of methanol in an aqueous solution at a pH of about 1 to 4 to form a water-soluble methyl ether of melamine-formaldehyde resin containing from 2.5 to 6 mols of combined formaldehyde and from 2 to 5 mols of combined methanol for each mol of melamine, and neutralizing the resulting solution; and then drying said first mentioned solution until a water-soluble, solid product is formed.

6. A water-soluble nitrogen-containing thermosetting resin comprising the product obtained by contacting in an alkaline aqueous solution a water-soluble preformed methyl ether of melamine-formaldehyde resin with from 0.1 to 0.5 mol of sodium bisulfite for each mol of melamine in said preformed resin and then drying said solution until a water-soluble solid product is obtained, said preformed resin having been prepared by reacting 1 molecular proportion of melamine with from about 3 to 8 molecular proportions of formaldehyde in an alkaline aqueous solution to form a melamine-formaldehyde resin and thereafter reacting said melamine-formaldehyde resin with from about 10 to 30 molecular proportions of methanol in an aqueous solution at a pH of about 1 to 4 to form a water-soluble methyl ether of melamine-formaldehyde resin containing from 2.5 to 6 mols of combined formaldehyde and from 2 to 5 mols of combined methanol for each mol of melamine and then neutralizing the resulting solution.

7. A process of preparing a solid nitrogen-containing thermosetting resin which comprises contacting a water-soluble preformed etherified amino-triazine-formaldehyde resin in an alkaline aqueous solution with an amount of an alkali metal salt of sulfurous acid sufficient to provide at least 0.1 mol of combined $SO_3$ for each mol of amino-triazine in said preformed resin and then drying the resulting solution whereby a solid resinous product is obtained, said preformed resin having been prepared by the reaction of 1 molecular proportion of an amino-triazine having at least 4 replaceable hydrogen atoms in the amino groups with from about 3 to 8 molecular proportions of formaldehyde in an alkaline aqueous solution to form a melamine-formaldehyde resin and thereafter reacting said melamine-formaldehyde resin with at least 10 molecular proportions of methanol in an aqueous solution at a pH of about 1 to 4 to form a water-soluble methyl ether of melamine-formaldehyde resin containing from 2.5 to 6 mols of combined formaldehyde and 2 to 5 mols of combined methanol per mol of amino-triazine and neutralizing the resulting solution.

8. A process of preparing a solid nitrogen-containing thermosetting resin which comprises reacting a water-soluble preformed etherified melamine-formaldehyde resin in an alkaline aqueous solution with an amount of an alkali metal of sulfurous acid sufficient to provide from 0.1 to 0.5 mol of combined $SO_3$ for each mol of melamine in said preformed resin, said preformed resin having been prepared by first reacting 1 molecular proportion of melamine with from about 3 to 8 molecular proportions of formaldehyde in an alkaline aqueous solution to form a melamine-formaldehyde resin and thereafter reacting said melamine-formaldehyde resin with from about 10 to 30 molecular proportions of methanol in an aqueous solution at pH of about 1 to 4 to form a water-soluble methyl ether of melamine-formaldehyde resin containing from 2.5 to 6 mols of combined formaldehyde and from 2 to 5 mols of combined methanol for each mol of melamine, and neutralizing the resulting solution; and then drying said solution at temperatures of from about 20 to 90° C. until a solid product is obtained.

9. A water-soluble solid nitrogen-containing thermosetting resin comprising the product obtained by contacting a water-soluble preformed etherified amino-triazine-formaldehyde resin in an alkaline aqueous solution with an amount of an alkali metal salt of sulfurous acid sufficient to provide at least 0.1 mol of combined $SO_3$ for each mol of amino-triazine in said preformed resin, and then drying the resulting solution until a solid product is obtained, said preformed resin having been prepared by first reacting 1 molecular proportion of an amino-triazine having at least 4 replaceable hydrogen atoms in the amino groups with from about 3 to 8 molecular proportions of formaldehyde in an alkaline aqueous solution to form a melamine-formaldehyde resin and thereafter reacting said melamine-formaldehyde resin with at least 10 molecular proportions of methanol in an aqueous solution at a pH of about 1 to 4 to form a water-soluble methyl ether of melamine-formaldehyde resin containing from 2.5 to 6 mols of combined formaldehyde and from 2 to 5 mols of combined methanol for each mol of said amino-triazine and then neutralizing the resulting solution.

FRANCIS A. BONZAGNI.

REFERENCES CITED

The following references are of record in the file of this patent:

UNITED STATES PATENTS

| Number | Name | Date |
| --- | --- | --- |
| 2,197,357 | Widmer | Apr. 16, 1940 |
| 2,388,143 | Harris | Oct. 30, 1945 |
| 2,407,599 | Auten | Sept. 10, 1946 |
| 2,454,078 | McGrew | Nov. 16, 1948 |

FOREIGN PATENTS

| Number | Country | Date |
| --- | --- | --- |
| 114,481 | Sweden | July 10, 1945 |